United States Patent [19]
Rusnack et al.

[11] Patent Number: 5,359,728
[45] Date of Patent: Oct. 25, 1994

[54] DATA INTEGRITY ASSURANCE IN A DISK DRIVE UPON A POWER FAILURE

[75] Inventors: Michael R. Rusnack; Ali Piranfar, both of Boise, Id.

[73] Assignee: Hewlett-Packard Company, Palo Alto, Calif.

[21] Appl. No.: 866,377

[22] Filed: Apr. 9, 1992

[51] Int. Cl.$^5$ .............................................. G06F 11/00
[52] U.S. Cl. .................................. 395/575; 395/425; 364/264.2; 364/DIG. 1; 371/14
[58] Field of Search ................... 395/575, 425; 371/14, 371/16.1, 66; 364/273.4, 273.5, 264.2

[56] References Cited

U.S. PATENT DOCUMENTS

| | | | |
|---|---|---|---|
| 4,096,560 | 6/1978 | Footh | 364/200 |
| 4,531,214 | 7/1985 | Torres et al. | 371/66 |
| 4,639,863 | 1/1987 | Harrison et al. | 364/200 |
| 4,733,366 | 3/1988 | Deyesso et al. | 364/900 |
| 5,034,915 | 7/1991 | Styrna et al. | 364/900 |
| 5,041,924 | 8/1991 | Blackborow et al. | 360/69 |
| 5,195,100 | 3/1993 | Katz et al. | 371/66 |

OTHER PUBLICATIONS

Baker et al., A priority event monitor for an interrupt-driven microprocessor, Mar. 1991, pp. 905–908, IEEE.

*Primary Examiner*—Robert W. Beausoliel, Jr.
*Assistant Examiner*—Norman M. Wright

[57] ABSTRACT

A disk drive package includes read/write circuits, a disk drive mechanism and a microprocessor. The microprocessor has a dedicated function input and an interrupt input. The dedicated function input is accessible through an external connector in the disk drive package, but the interrupt input has no direct external access. The microprocessor is programmed to examine the dedicated function input only upon power-up to determine if it has been enabled. The disk drive package is modified to include a circuit that couples the dedicated function input to the interrupt input to the microprocessor. A power supply provides a power fail imminent signal to the dedicated function input, and because the dedicated function input is connected to the interrupt input, such signal causes an interrupt to occur in the operation of the disk drive whereby any write to disk in progress is completed prior to a power fail event.

7 Claims, 2 Drawing Sheets

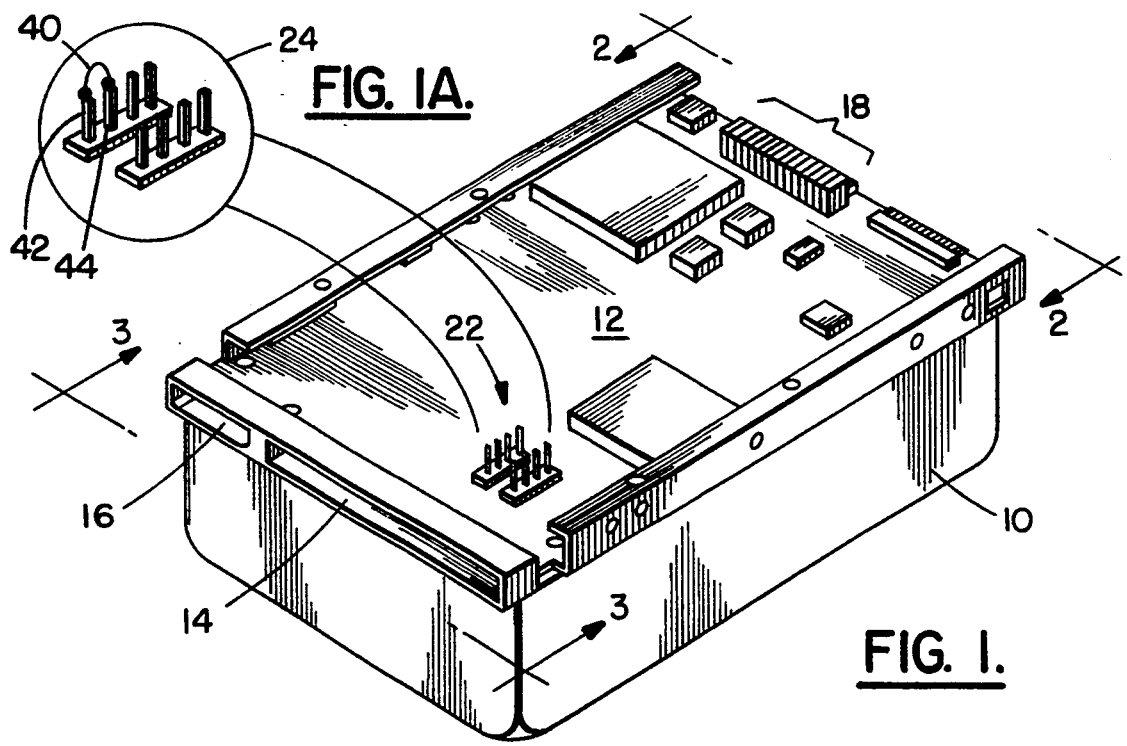
FIG. 1A.
FIG. 1.
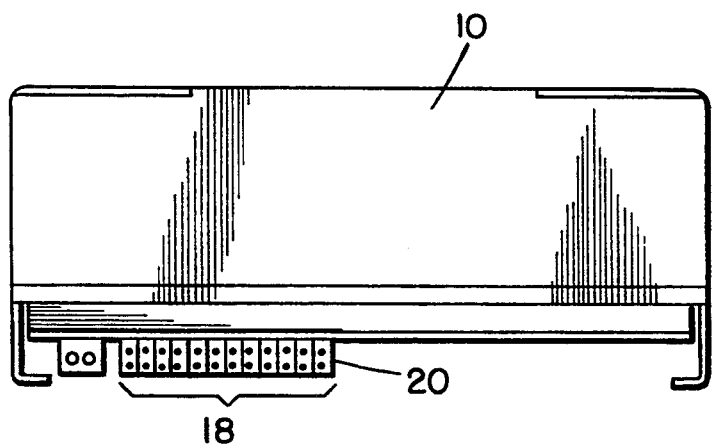
FIG. 2.
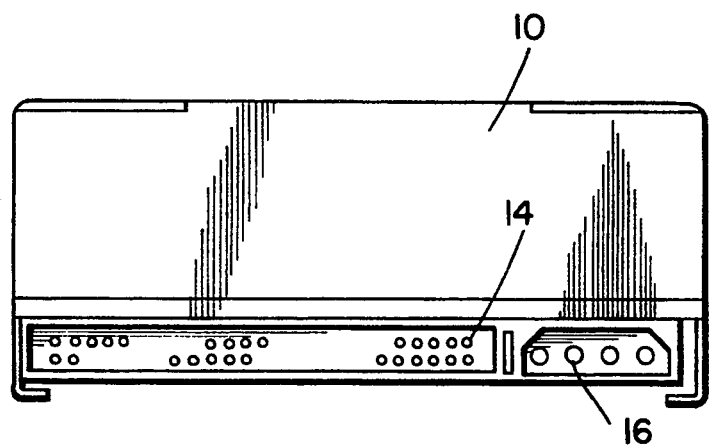
FIG. 3.

DATA INTEGRITY ASSURANCE IN A DISK DRIVE UPON A POWER FAILURE

FIELD OF THE INVENTION

This invention relates to disk drives, and more particularly, to a system for assuring the integrity of data in a disk drive sector when a power failure occurs in the course of a write action.

BACKGROUND OF THE INVENTION

The computer industry, in general, and the workstation and personal computer (PC) markets in particular, have been moving rapidly towards the use of interfaces that are standards-based. A standards-based interface is one which has been adopted by the industry as a common denominator, thereby assuring that any device exhibiting that interface will be able to communicate with another device having the same interface. In the area of peripherals, and especially disk drives, the issue of plug-to-plug hardware compatibility is extremely important, as such peripherals are often purchased as stand-alone devices for use with other data processing equipment.

One widely employed standard interface is the Small Computer System Interface (SCSI) which is implemented by a parallel, multimaster, I/O bus between a computer and a peripheral device. Among other features, the SCSI interface enables a disk controller to hide many of the details of disk operation from a host computer. The computer does not have to manage the details of where the file is physically located and does not have to separate header and trailer information from the data.

The SCSI interface was designed and adopted at a time when the norm was a single PC connected to a single disk drive. Today, disk drives are being integrated into multi-user systems. In such an environment, known problems with the SCSI interface that were present, but ignored, in the environment of single PC - single disk drive systems, cannot be ignored. Thus, in a multi-user system, the user expects, in the event of a power failure, that stored data will be protected and that the system will be able to easily recover. This protection feature is referred to as sector atomicity. Sector atomicity requires that a disk drive will complete a write of a physical sector on a disk under all conditions, even in the event of loss of supply voltage to the drive. Thus, sector atomicity assures that data being written, under all conditions, is actually written into non-volatile memory. Thus, upon a re-start, it is clearly known where to recommence operations and no data is lost.

The SCSI interface does not address this issue. In a single PC/disk drive system, if a power failure occurs, data is lost—but that is the user's problem, to be solved by a re-booting of the system and re-entry by the user of the lost data.

The SCSI interface standard does not provide for a power fail imminent signal. Therefore, alternative techniques have been suggested to assure sector atomicity. It is known that certain disk drives, in order to complete the write of a sector, require at least 330 microseconds of valid supply voltage. Thus, given sufficient warning of a power fail, such a disk drive can complete a sector write (and prevent new writes from starting)—thereby enabling ready recovery once power is restored. It has been suggested that power supply monitoring circuitry be included in the disk drive. It has been found, however, that there is a great variation in voltage decay times in the event of a power fail. Thus, there can be no guarantee that such monitoring circuitry can provide the minimal pre-notice of the power failure and assure a valid supply voltage for the required duration.

Disk drive power supplies do provide, as a feature, a signal output that predicts an imminent power failure. That output generally provides greater than 400 microseconds of warning of a power failure. Such power supplies accomplish this function by monitoring supply levels and have capacitor sizes that store sufficient charge to temporarily support the output level, even in the event of A/C supply failure. Notwithstanding the availability of an imminent power fail signal, SCSI and other standard interfaces do not provide the capacity to handle such.

Accordingly, it is an object of this invention to provide a disk drive having an industry standard interface with the capability to respond to a power fail signal and assure sector atomicity.

It is another object of this invention to provide a disk drive that invariably insures sector atomicity upon a power fail without requiring external alteration to the disk drive package.

SUMMARY OF THE INVENTION

A disk drive package includes read/write circuits, a disk drive mechanism and a microprocessor. The microprocessor has a dedicated function input and an interrupt input. The dedicated function input is accessible through an external connector in the disk drive package, but the interrupt input has no direct external access. The microprocessor is programmed to examine the dedicated function input only upon power-up to determine if it has been enabled. The disk drive package is modified to include a circuit that couples the dedicated function input to the interrupt input to the microprocessor. A power supply provides a power fail imminent signal to the dedicated function input, and because the dedicated function input is connected to the interrupt input, such signal causes an interrupt to occur in the operation of the disk drive whereby any write to disk in progress is completed prior to a power fail event.

DESCRIPTION OF THE DRAWINGS

FIGS. 1 and 1A illustrate a perspective view of a disk drive package shown bottom-up;

FIG. 2 is a bottom down view of the package of FIG. 1 taken along line 2—2;

FIG. 3 is bottom down view of the package of FIG. 1 taken along line 3—3;

DETAILED DESCRIPTION OF THE INVENTION

Figure 4:
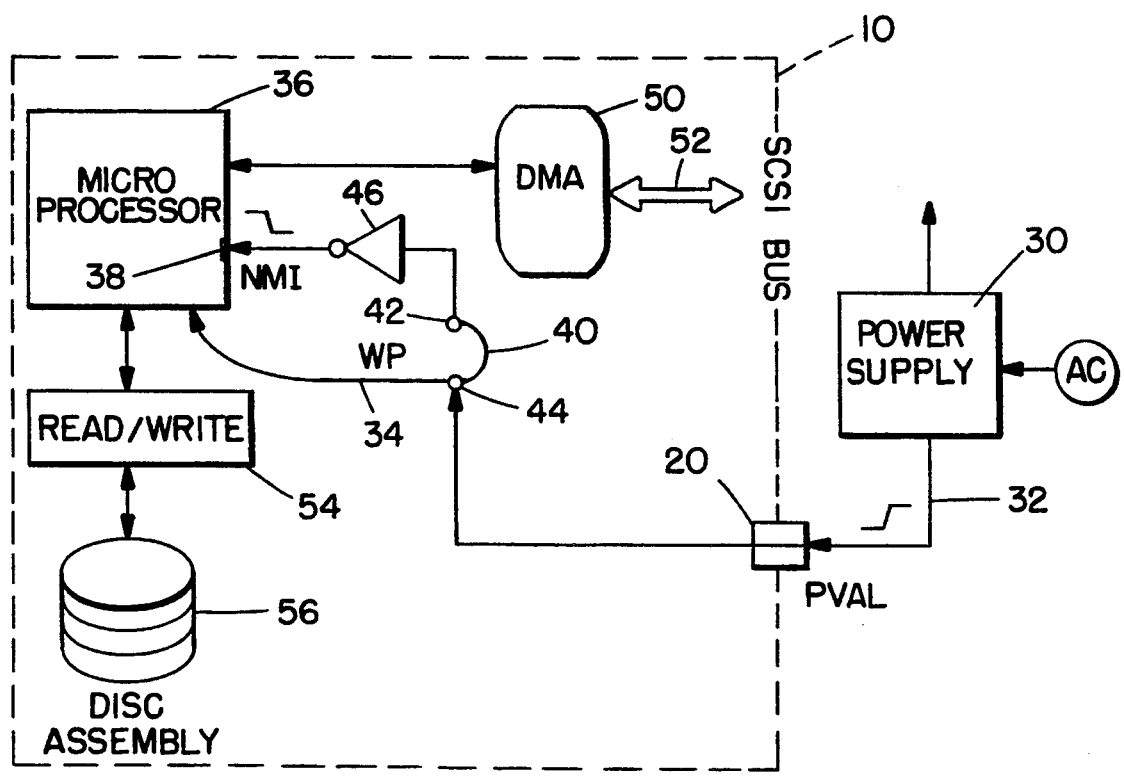
FIG. 4 is a high level block diagram illustrating the invention.

Referring to FIGS. 1-3, a disk drive mechanism is housed within a cover 10 and is mounted on a circuit board 12. The main interface to the disk drive package is achieved through an SCSI standard connecter 14. Immediately adjacent SCSI connector 14 is a power receptacle 16 that enables interconnection to the disk drive of 12 volt and 5 volt supplies.

At the opposite extremity of the disk drive package are a plurality of "option" connectors 18 that enable various features to be enabled. For instance, one of connectors 18 enables the disk spindle to be synchronized from an external source. Another input (i.e., connector 20) is adapted to receive a logic level that enables a Write Protect feature within the disk drive. The Write Protect feature prevents all disk surfaces from being written onto during operation of the disk drive, thereby turning the device into a read-only memory.

To enable one or more of such optional features, a plurality of pins 22 are provided that extend from the bottom of circuit board 12. An expanded view of those pins is shown at 24. To enable an option, a jumper 40 is placed between a pair of pins, e.g. 42, 44, so that a connector 18 becomes electrically connected to functional wiring within the disk drive. Certain of pins 22 are left open for subsequent feature additions.

As has been above indicated, an object of this invention is to enable sector atomicity during a write in the event of a power failure. There is no capability to handle a power fail signal in the standard interface (e.g., SCSI) used with the disk drive. The objective, therefore, is to implement sector atomicity, without modifying the interface connection—and thereby rendering the disk drive incapable of connecting to the "standard interface".

To assure sector atomicity during a power failure, at least two conditions must be met: (a) any write to a sector must be completed, thus the drive must be provided with sufficient notice of an imminent power failure to enable the write's completion (e.g., 330 microseconds or longer); and (b) the drive must not commence a write after the imminent power fail notice, until the supply voltage is again guaranteed as being valid.

Disk drive power supplies commonly provide a signal output that indicates an imminent power failure. Referring to FIG. 4, power supply 30 is one such supply and via line 32 provides a power value signal (PVAL) on line 32 which indicates, upon its rise, that a power failure will occur after a predetermined time period. Input line 32 is applied to connector 20 which, under other circumstances, is dedicated to serve as the input to line 34 to enable the disk drive's Write Protect feature.

Microprocessor 36 is also provided with a Non-Maskable Interrupt (NMI) input 38 and in response to a high to low transition thereon, institutes an interrupt procedure. That interrupt, as will be hereinafter seen, enables sector atomicity to be achieved. A conductive jumper 40 is provided that connects option pins 42 and 44. Pin 42 is connected to NMI input 38 via an inverter 46. Inverter 46 and the wiring that connects it to pin 42 and NMI input 38, are the only required additions to the disk drive package to enable sector atomicity in power fail events.

The remaining apparatus within the disk drive package is well known and includes a direct memory access circuit 50 that is connected to an input/output SCSI bus (represented by arrows 52). A read/write circuit module 54 connects to a disk assembly 56 and provides the read/write functions therefor.

As above indicated, microprocessor 36 examines Write Protect line 34 only at power-up and not thereafter. If at that time a low level is seen on Write Protect line 34, microprocessor 36 assumes that the Write Protect function has been disabled. The PVAL output from power supply 30 is at a low level at all times except in the case of an anticipated power failure, at which point line 32 transitions to a high logic state. NMI input 38 to microprocessor 36 only commences an interrupt operation upon a low to high input transition. As a result, inverter 46 is included to reverse the input levels seen via conductive jumper 40 from input connector 20.

Upon an assertion of a low to high transition at NMI input 38, microprocessor 36 initiates a system interrupt. The system interrupt procedure is configured in firmware within microprocessor 36 and enables the completion of a current physical sector write; and prevents any SCSI transaction from affecting the disk drive for 1.5 seconds by responding "busy" if polled. After the 1.5 second interval, microprocessor 36 commences a "check condition" routine.

In operation, power supply 30 continuously monitors its input AC line to detect an imminent power failure. Upon such an occurrence, a high to low transition is placed on output line 32 which is fed via connector 20 to pin 44. Since Write Protect line 34 (connected to pin 44) is only polled at power-up, a transition on line 32 from power supply 30 that occurs thereafter, has no effect upon microprocessor 36. However, as a result of jumper 40 and inverter 46, the power fail imminent low to high transition is converted to a high to low transition at NMI input 38. This input causes microprocessor 36 to institute an interrupt action, thereby enabling sector atomicity during write to occur and preventing loss of data.

As will be seen by those skilled in the art, the inclusion of the sector atomicity feature requires that the Write Protect feature be disabled. Nevertheless, sector atomicity is assured at least cost and enables the standard interface to be retained.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A disk drive package that includes read/write circuitry and a disk drive mechanism, said disk drive package further comprising:

microprocessor means positioned within said disk drive package and having dedicated disk drive function input and an interrupt input, said dedicated disk drive function input accessible via a first pluggable connector in said disk drive package, said microprocessor means programmed to examine said dedicated disk drive function input only upon power-up to determine if it has been enabled;

circuit means for coupling said dedicated disk drive function input to said interrupt input to enable a power-fail-imminent signal applied to said dedicated disk drive function input to also be applied to said interrupt input; and power supply means for providing said power-fail-imminent signal, after power-up, to said first pluggable connector, said power fail imminent signal ignored by said dedicated function input, but via said circuit means, causing said microprocessor means to institute an interrupt in operation of said disk drive to enable a write to a disk sector which is in process at a time said power-fail-imminent signal is asserted, to be completed prior to the occurrence of the power failure.

2. The disk drive package as recited in claim 1 further comprising: a disk drive external interface bus and connector, said bus and connector having no provision for a power fail imminent signal.

3. The disk drive package as recited in claim 2 wherein said disk drive package's external interface is an SCSI specified interface.

4. The disk drive package as recited in claim 1 wherein said circuit means includes an inverter that converts said power-fail-imminent signal to a signal recognized by said interrupt input to said microprocessor means.

5. The disk drive package as recited in claim 4 wherein said circuit means includes a pair of pins extend externally from said package, one said pine connected to said dedicated function input and another said pin connected to said inverter, and further including a jumper that electrically connects said two pins so as to make electrical connection therebetween.

6. The disk drive package as recited in claim 1 wherein said interrupt prevents any new writes from commencing until the interrupt is removed.

7. The disk drive package as recited in claim 1 wherein said dedicated function input is a Write Protect function that disables writes to the disk drive package when enabled.

* * * * *